United States Patent
Roh

(10) Patent No.: US 6,690,633 B2
(45) Date of Patent: Feb. 10, 2004

(54) METHOD AND APPARATUS FOR CONTROLLING OPTIMAL WRITING POWER FOR AN OPTICAL RECORDING MEDIUM

(75) Inventor: Jin Tae Roh, Kyunggi-do (KR)

(73) Assignee: LG Electronics Inc., Seoul (KR)

( * ) Notice: Subject to any disclaimer, the term of this patent is extended or adjusted under 35 U.S.C. 154(b) by 412 days.

(21) Appl. No.: 09/734,004

(22) Filed: Dec. 12, 2000

(65) Prior Publication Data

US 2001/0004344 A1 Jun. 21, 2001

(30) Foreign Application Priority Data

Dec. 17, 1999 (KR) .............................. 99-58811

(51) Int. Cl.$^7$ ................................................ G11B 7/00
(52) U.S. Cl. ............................. 369/53.22; 369/47.52; 369/116
(58) Field of Search .............................. 369/116, 53.22, 369/47.53, 47.52, 44.29, 44.32, 44.36, 47.49, 47.51, 53.27

(56) References Cited

U.S. PATENT DOCUMENTS 5,436,880 A * 7/1995 Eastman et al. ......... 369/47.51
5,590,111 A * 12/1996 Kirino et al. ............ 369/47.53
5,640,381 A * 6/1997 Call et al. ................ 369/47.52

* cited by examiner

Primary Examiner—William Korzuch
Assistant Examiner—Kim-Kwok Chu
(74) Attorney, Agent, or Firm—Birch, Stewart, Kolasch & Birch, LLP

(57) ABSTRACT

A method and apparatus for optimally recording data on an optical recording medium by controlling recording beam power depending upon the state of the recording layer of the recording medium. To compensate for variant reflection ratio at inner and outer radius caused by the uneven recording layer thickness, the power of recording beam is adjusted and as a result the asymmetric ratio is maintained constant over the recording medium without regard to the radius. A signal associated with the recording layer thickness variation is detected and the recording beam power is adjusted to compensate for the variation of the characteristic of recorded marks, based upon the signal. The adjusted recording beam power is not readjusted by the running optimal power control (ROPC). The method in accordance with the present invention provides a constant asymmetric ratio over the recording medium, thereby reducing the likelihood of reproduced data error.

11 Claims, 6 Drawing Sheets

Conventional Art

Conventional Art

US 6,690,633 B2

METHOD AND APPARATUS FOR CONTROLLING OPTIMAL WRITING POWER FOR AN OPTICAL RECORDING MEDIUM

BACKGROUND OF THE INVENTION

1. Field of the Invention

The present invention relates to a method and apparatus for optimally recording data on an optical recording medium by adjusting the recording beam power depending upon the state of the recording layer of the optical recording medium.

2. Description of the Related Art

FIG. 1 depicts an optical recording/reproducing apparatus for recording/reproducing data on/from an optical recording medium, comprising a recording signal processing unit 20a for converting input digital data into recording-formatted data after adding an error correction code (ECC), a channel bit encoder 30 for reconverting the recording-formatted data into a bit stream, an optical driver 31 for creating an optical drive signal in response to an input signal, an optical pickup 11 for recording the input bit stream on a recording medium 10 using the optical drive signal or for retrieving recorded data from the recording medium 10, an R/F unit 40 for equalizing and shaping the signal reproduced by the optical pickup 11, a drive unit 50 for driving the optical pickup 11 and a spindle motor M, a servo unit 60 for controlling the drive unit 50 using the rotation speed of the recording medium 10 and tracking and focus error signals, a reproduced signal processing unit 20b for retrieving original data form the binary data outputted from the R/F unit 40, and a microcomputer 70 for controlling the overall recording/reproducing process and the recording beam power.

Before recording data on the recording medium 10, the optical recording/reproducing apparatus performs optimal power calibration (OPC) in the test area of the recording medium 10 to obtain optimal recording beam power.

Upon completion of the optimal power calibration (OPC), the microcomputer 70 controls the optical driver 31 so that input data can be recorded on the recording medium 10 with the obtained optimal recording beam power.

The characteristic of the recording layer, however, changes from inner radius to outer radius. Therefore, although data is recorded with the obtained optimal beam power, the quality of reproduced signal may not be preserved at the outer radius.

As shown in FIGS. 2 and 3, the variation of the recording layer characteristic results from the varying thickness of the recording layer, which is caused by a disk manufacturing process called the spin coating. Generally, the manufacture of optical disks needs the spin coating that creates the recording layer of an optical disk by injecting material for recording layer between the reflective layer and disk substrate while rotating the disk. Therefore, uneven spread of the recording material results in the thickness of the recording layer varying with the disk radius. Owing to the centrifugal force caused by the disk rotation, the thickness of the created recording layer tends to increase from inner radius to outer radius.

Unless the thickness of the recording layer is uniform over the disk, the response of the recording layer to applied recording laser beam also differs with the thickness. As the thickness of the recording layer increases, the extent to which the recording layer is burnt by the recording beam decreases and thus the reflection ratio of recorded marks increases. As a result, the reflection ratio of recorded marks is proportional to the thickness of the recording layer. FIG. 2 shows the trend of reflection ratio of recorded marks over the radius.

The aforementioned optimal power calibration (OPC) is intended to obtain optimal writing power that guarantees the recommended asymmetric ratio $\beta$ of reproduced signals. It is likely, however, that the recommended asymmetric ratio $\beta$ is unattainable at the outer radius due to the variation of the reflection ratio of marks and therefore the quality of reproduced signal deteriorates at the outer radius.

To solve this problem, the microcomputer 70 continues to control the writing power by measuring the level of the beam reflected in response to recording beam so that the level of the reflected beam remains constant at the test area and data area of the disk. The reflected beam is measured at the point where the level is stabilized sufficiently, as shown in FIG. 3. The process is called the running optimal power control (ROPC).

The ROPC provides high-quality reproduced signals since the reflection level of recorded marks (hereinafter referred to as B-Level 0) is maintained constant over all tracks without regard to the radius, as shown in FIG. 4.

Unlike the beam reflected by marks, the laser beam level reflected by spaces to which recording laser beam has not been applied is not maintained constant by the ROPC (running optimal power control) because the spaces are still subject to the recording layer thickness variation. Since the reflection ratio of spaces decreases as the recording layer thickness increases, the beam level reflected by spaces decreases from inner radius to outer radius. Considering the fact that the beam level reflected by marks remains constant, the asymmetric ratio $\beta$ decreases from inner radius to outer radius, as shown in FIG. 5.

The variation of the asymmetric ratio $\beta$ leads to the jitter increase of reproduced signals and this in turn increases the likelihood of data error occurrence. Besides, if the ROPC process adjusts the writing power to maintain the reflection level in the area with scratches or fingerprints, the reflection ratio in space intervals relatively decreases and therefore the value of $\beta$ becomes lower abruptly in such area. This also increases signal jitter and data errors.

SUMMARY OF THE INVENTION

It is an object of the present invention to provide an apparatus and method for controlling optimal writing power for an optical recording medium that maintains a required asymmetric ratio despite recording layer thickness variation at inner and outer radius.

It is another object of the present invention to provide an apparatus and method for controlling optimal writing power for optical recording media that maintains a required asymmetric ratio even in the defect area of the optical recording medium.

The method for controlling optimal writing power for an optical recording medium in accordance with the present invention detects a signal indicative of the thickness variation of the recording layer of the recording medium and controls the writing power to compensate for the characteristic variation of recorded marks due to the thickness variation of the recording layer, based upon the detected signal.

These and other objects of the present application will become more readily apparent from the detailed description given hereinafter. However, it should be understood that the detailed description and specific examples, while indicating preferred embodiments of the invention, are given by way of illustration only, since various changes and modifications within the spirit and scope of the invention will become apparent those skilled in the art from this detailed description.

BRIEF DESCRIPTION OF THE DRAWINGS

The accompanying drawings, which are included to provide a further understanding of the invention, illustrate the preferred embodiments of the invention, and together with the description, serve to explain the principles of the present invention.

In the drawings.

DETAILED DESCRIPTION OF THE PREFERRED EMBODIMENTS

In order that the invention may be fully understood, preferred embodiments thereof will now be described with reference to the accompanying drawings.

Figure 1:
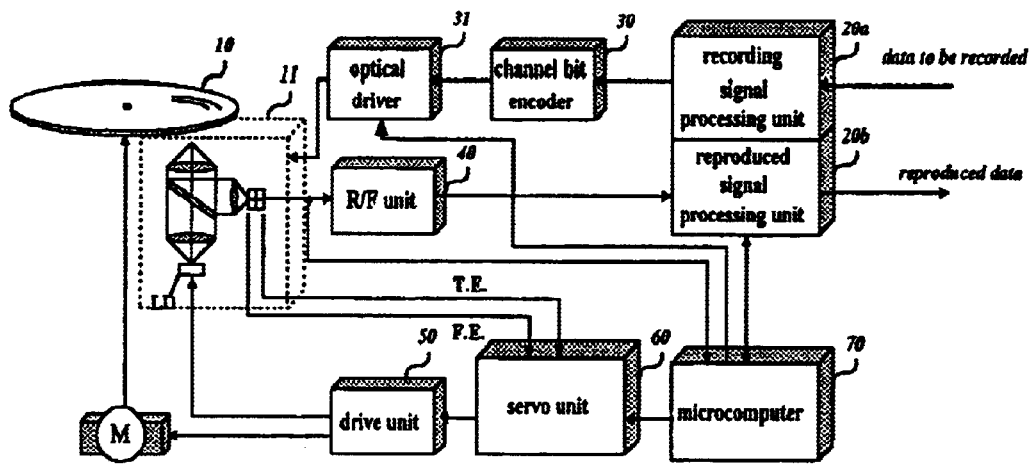
FIG. 1 is a schematic diagram of a conventional optical recording/reproducing apparatus.
Figure 2:
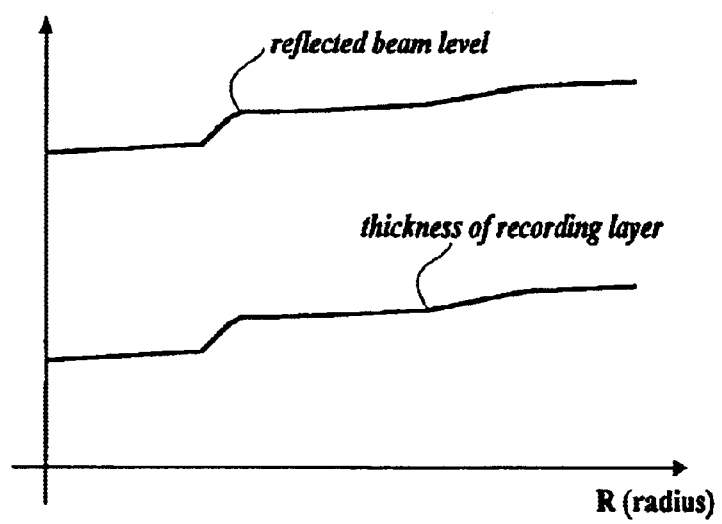
FIG. 2 is a graph showing the recording layer thickness of a general recording medium and the corresponding reflection property.
Figure 3:
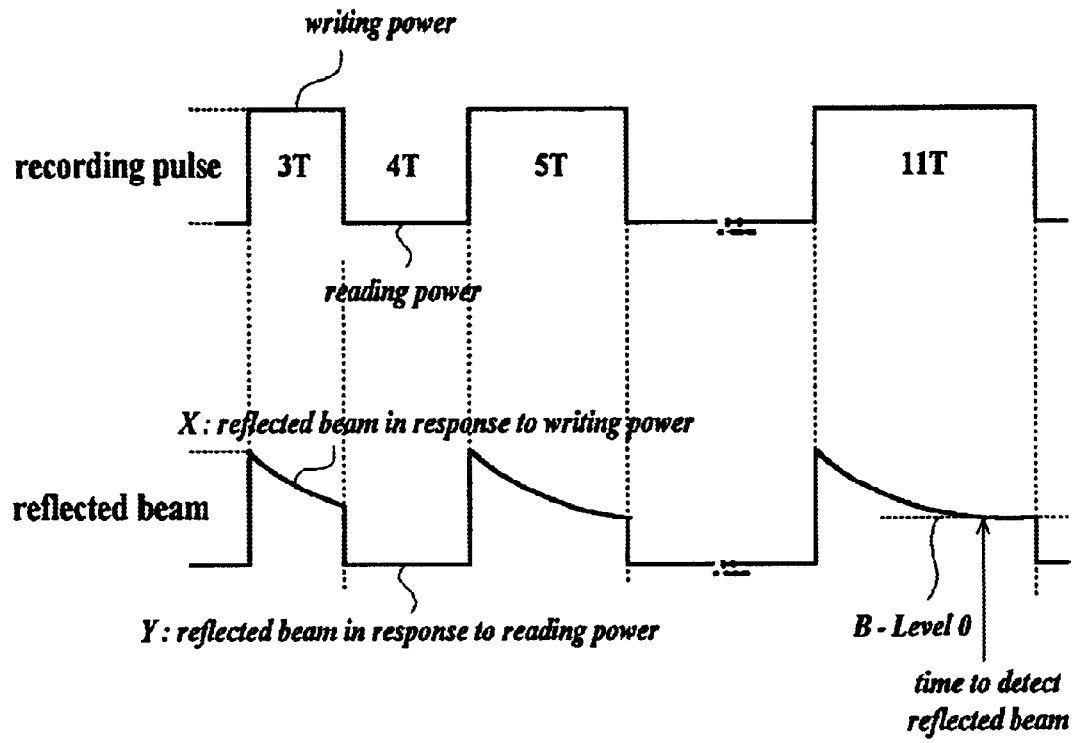
FIG. 3 is example waveforms of a recording pulse and a reflected beam in response to the recording pulse.
Figure 4:
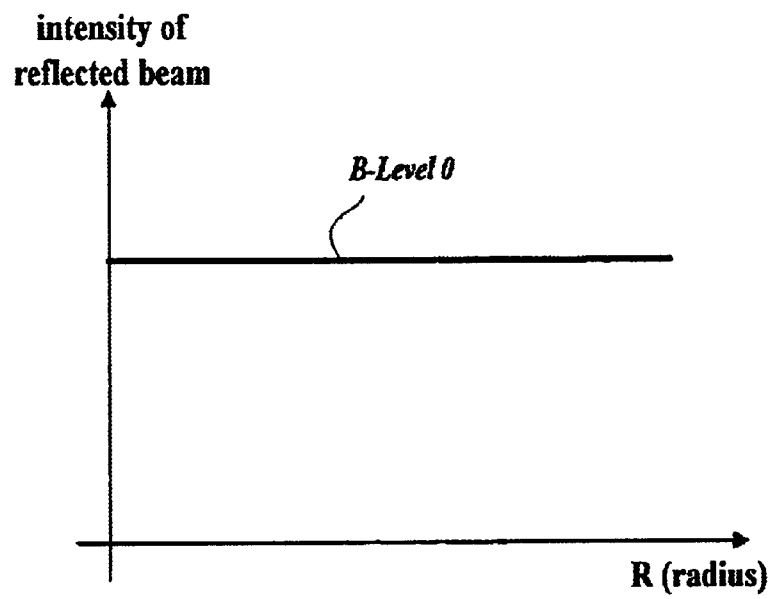
FIG. 4 is a graph showing the constant reflection ratio obtained by the running optimal power control (ROPC)
Figure 5:
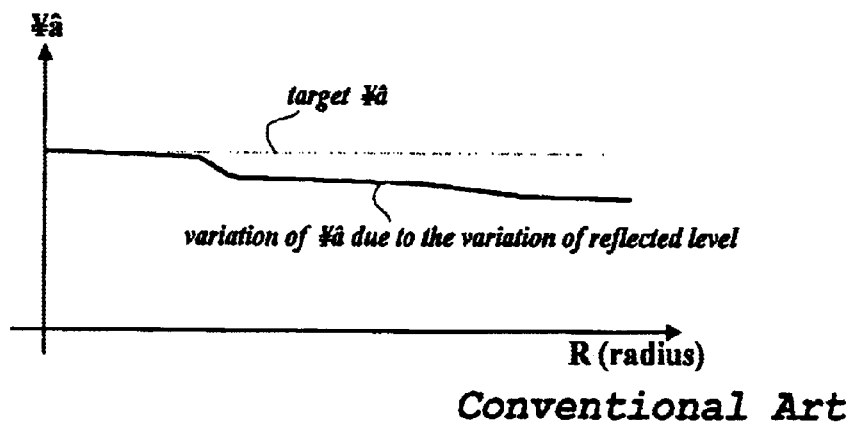
FIG. 5 is a graph showing asymmetric ratio β versus disk radius, the asymmetric ratio not being maintained constant despite the running optimal power control (ROPC)
Figure 6:
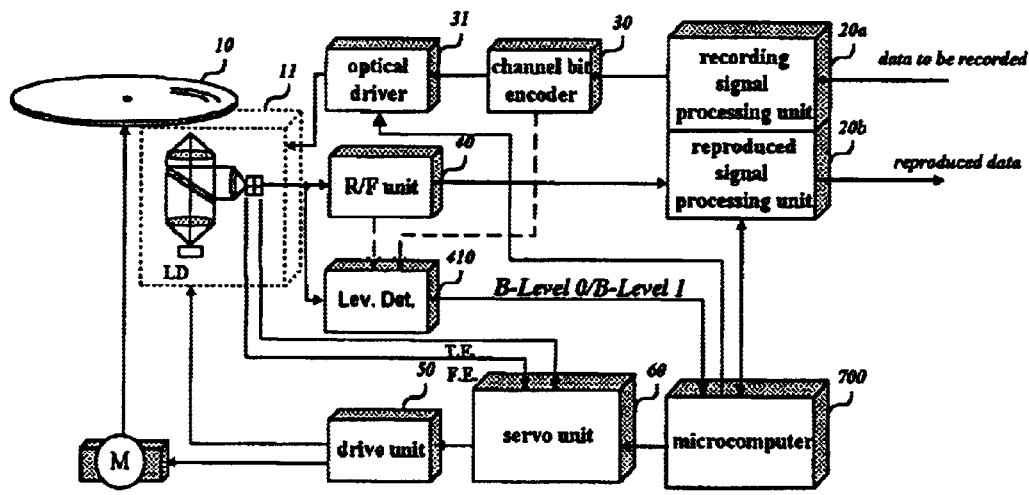
FIG. 6 is a schematic diagram of an optical recording/reproducing apparatus embodying the present invention.

FIG. 6 depicts an optical recording/reproducing apparatus embodying the present invention, comprising the apparatus shown in FIG. 1 and an additional level detecting unit 410 for separately detecting the levels of beams reflected by marks and spaces while recording data. The microcomputer 700 performs recording beam power control other than the operation conducted in the apparatus in FIG. 1. Other components play the same roles.

Figure 7:
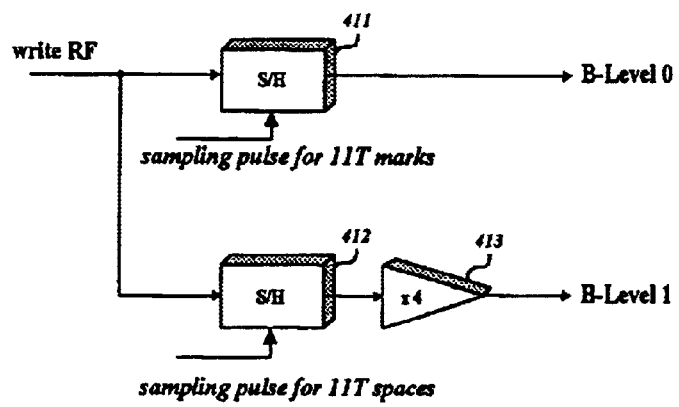
FIG. 7 is a schematic diagram showing the internal structure of the level detecting unit in FIG. 6.

FIG. 7 shows the detailed structure of the level detecting unit 410, comprising a first sampler 411 for sampling and holding the laser beam reflected by 11T-length marks in the course of data recording, a second sampler 412 for sampling and holding the laser beam reflected by 11T-length spaces in the course of data recording, and an amplifier 413 for amplifying the output of the second sampler 412 by a predetermined gain. The locations of 11T marks and spaces are detected by the R/F unit 40.

Figure 8:
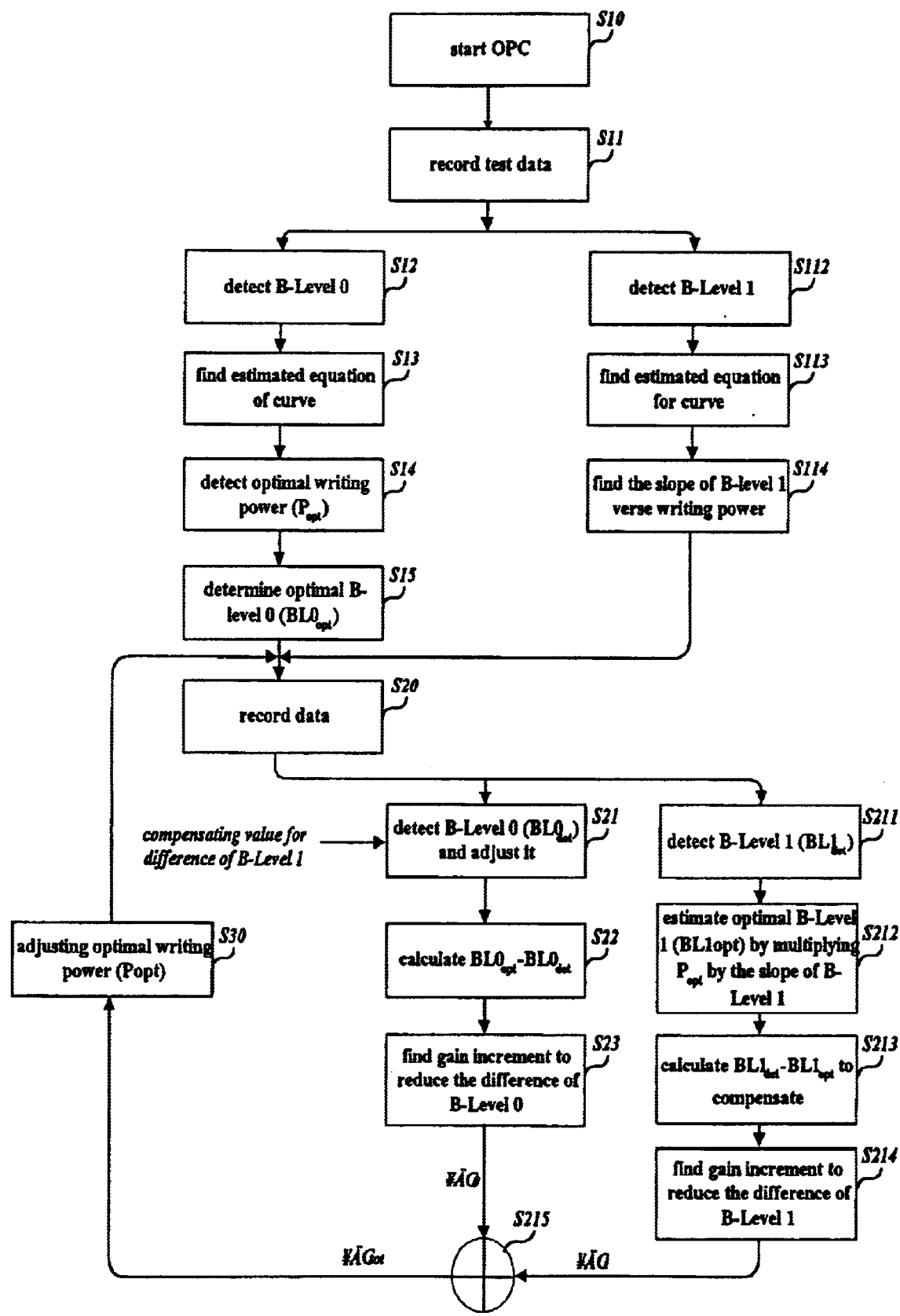
FIG. 8 is a flow diagram of the method for controlling optimal writing power in accordance with an embodiment of the present invention.

The optimal writing power control method in accordance with an embodiment of the present will be explained with reference to a flow diagram shown in FIG. 8 along with FIGS. 6 and 7.

On receiving a request for recording data, the microcomputer 700 moves the optical pickup 11 to the test area of the recording medium to start optimal writing power calibration (S10) and begins to record test data in the area with varying writing powers by controlling the optical driver 310 (S11).

While the test data is being recorded, the beam reflected by marks (B-Level 0) in response to the recording laser beam is applied to the first sampler 411 and the laser beam reflected by spaces (hereinafter referred to as B-Level 1) in response to the reproducing laser beam is applied to the second sampler 412. The samplers 411 and 412 sample the input signals when the R/F unit 40 detects 11T-length marks and spaces, respectively. Instead of the R/F unit 40, the channel bit encoder 30 may inform the samplers of the instants of sampling, because the channel bit encoder 30 knows when 11T-length data are recorded.

Since it takes some time for the signals reflected by the 11T-length marks or spaces to be stabilized, the sampling of the 11T-length signals is carried out at the latter 70% point of each 11T-length mark or space.

Unlike the signal reflected by marks, the signal reflected by spaces is created by the reproducing laser beam whose power is less than that of the recording laser beam, and therefore its amplitude variation is relatively small. To make it easier to detect the amplitude variation, the output of the second sampler 412 is amplified by the amplifier 413 to enlarge the characteristic change of the media.

As well as the 11T-length marks and spaces, marks and spaces of other length can also be used for reflection level detection as long as their lengths are longer than 8T, because 8T-length signals are long enough to stably reflect the recording layer characteristic variation. However, the use of 11T-length signals may be most appropriate in that the occurrence of the 11T-length signals has the lowest frequency and other signals ay be used for the ALPC or servo control in the course of data reproduction, which might be interfered with by the amplification.

After detecting the B-Level 0 and B-Level 1 (S12 and S112) the microcomputer 700 stores the detected level values and the corresponding optical power in an internal memory and repeats the process, changing the recording beam power.

Figure 9:
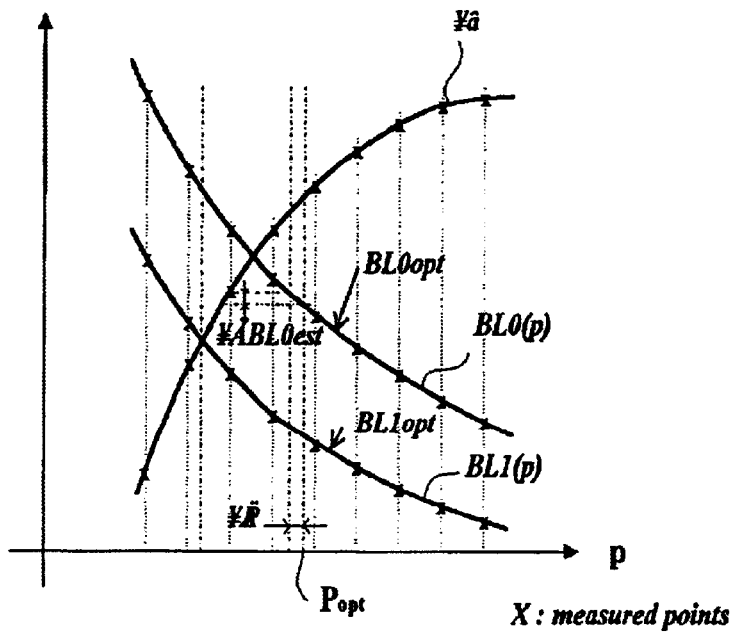
FIG. 9 is a graph showing the relations the asymmetric ratio versus the writing power, the reflection ratio due to the recording pulse versus the writing power, and reflection ratio due to the reproduced pulse versus the writing power.

If a prescribed number of sets of the recording beam power and the corresponding signal levels are obtained by the above procedure, the microcomputer 700 constructs a graph showing the relation between the beam levels and the associated recording beam power, as shown in FIG. 9 (S13 and S113). The slope of the B-Level 1 curve calculated at each sub-interval is stored in the internal memory (S114). Unless the slope value of each sub-interval shows a large variation, which means the curve is approximate to a line, a representative slope is stored.

When the test data recording finishes, the microcomputer 700 controls the optical pickup 11 to reproduce the recorded data and measure the asymmetric ratio to the reproduced signal according to each writing power. The microcomputer 700 adds the measured asymetric ratio to the graph constructed before. From the new graph shown in FIG. 9, the optimal writing power Popt is determined (S14) and the optimal B-Level 0 value (BL0opt) corresponding to the optimal power Popt is found and stored (S15).

Finishing the above process, the microcomputer 700 controls the channel bit encoder 30 and optical driver 31 to record input data on the recording medium after converting the input data, to recording-formatted data by the digital recording signal processing uni 20a (S20).

During the recording process, the microcomputer 700 measures the B-Level 0 and B-Level 1 outputted by the level detecting unit 410 (S21, S211). Then the microcomputer 700 calculates the difference between the measured B-Level 0 (BL0det) and the optimal value (BL0opt) stored in the internal memory (S22) and determines the increment (Δ?G0) of the optical drive gain G to reduce the difference (S23). Among the slope values of the B-Level 1 stored previously, the slope (?BL1) corresponding to the current writing power is chosen from the graph and the chosen slope is multiplied by the current optimal writing power Popt, which yields th optimal B-Level 1. (BL1opt), which is supposed to be detected in the data area by the current recording beam (S212).

Then, the microcomputer 700 calculates the difference between the calculated optimal B-Level 1 (BL1opt) an the detected B-Level 1 (BL1det) (S213). Denoting the difference by BL1 comp, the microcomputer 700 then finds the increment (Δ?G1) of the optical driver gain G to compensate for BL1comp (S214).

Once the gain increment values Δ?G0 and Δ?G1 are obtained by following the above procedure, the actual compensation value Δ?Gtot is obtained by adding the two increment value or subtracting one from the other (S215). The gain of the optical driver 31 is increased by the obtained compensation value Δ?Gtot so that the current optimal power (Popt) is adjusted in consideration of the detected values B-bevel 0 and B-Level 1 (S30).

For instance if the B-Level 0 remains constant and only the B-Level 1 decreases while data recording proceeds from the inner radius to outer radius, the gain increment value Δ?G 1 obtained by the steps S211 through S214 is negative and thus the recording beam power decreases. The reason is that because the reflection ratio of the recording medium increases from the inner radius to outer radius, the reflection ratio by the recorded marks should increase accordingly to maintain the asymmetric ratio β constant.

In the case where the B-Level 0 increases by reducing the recording beam power as mentioned above, if the gain compensation steps S21 through S23 to maintain the B-Level 0 constant are carried out by the conventional running optimal power control (ROPC) method, a gain compensation to reduce the level of the beam reflected by marks occurs and consequently the effects of the gain compensation steps S211 through S214 to maintain the asymmetric ratio constant are canceled.

Therefore, in order to maintain the asymmetric ratio constant by changing the recording beam power according to the detected B-Level 1, in the step S21 the measured B-Level 0 (BL0det) should be adjusted in consideration of the adjusted recording beam power. For example, if the recording beam power is decreased by Δ?P due to the increase of B-Level 1, the microcomputer 700 detects from the graph shown in FIG. 9 he estimated increment Δ?BL0est of the B-Level 0 caused by the recording beam power decrease, adds the estimated increment Δ?BL0est to the measured BL0det or subtract Δ?BL0est from the BL0det, and calculates the difference between the value and the optimal B-Level 0 (BL0opt), thereby preventing the recording beam power adjusted to compensate for the B-Level 0 based on the B-Level 1 from being readjusted by the steps S21 through S23 for compensating for the B-Level 0 variation.

The aforementioned process records data with recording beam power adjusted depending upon the B-Level 1 based on the reflection ratio of the marks recorded by the optimal writing power obtained in the test area. Thus, the B-Level 0 has a constant difference with respect to the B-Level 1, thereby maintaining the asymmetric ratio of the reproduced signal constant as intended in the test area.

Figure 10:
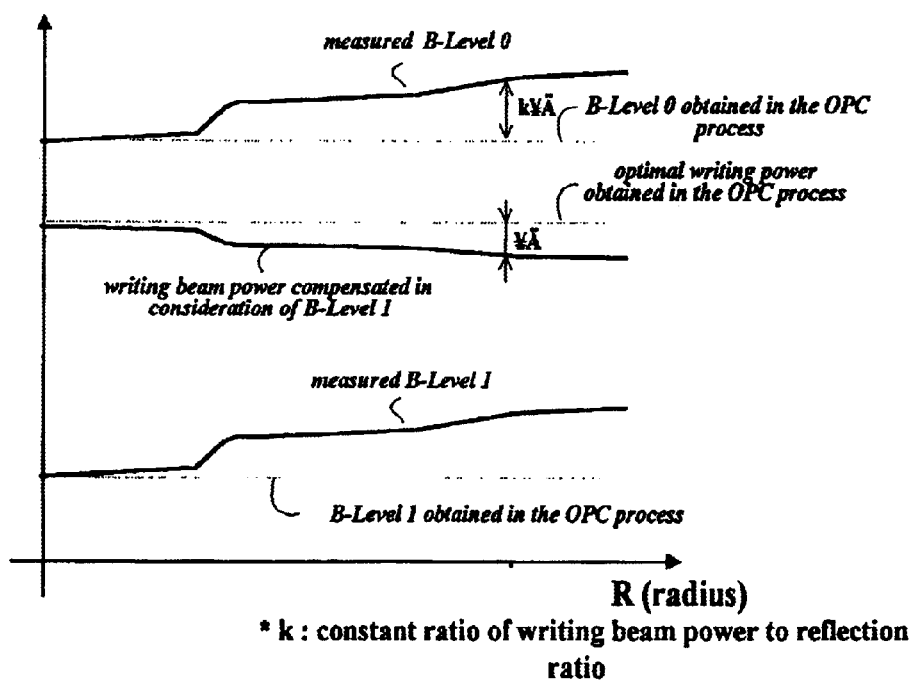
FIG. 10 is a graph showing the reflection characteristics of the recording medium and the recording beam power adjusted by the method in accordance with an embodiment of the present invention.
Figure 11:
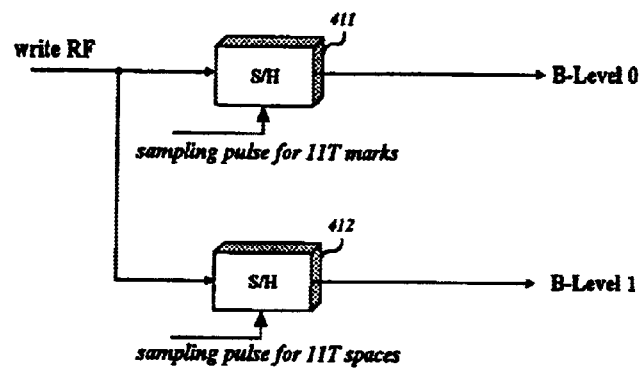
FIG. 11 is a schematic diagram showing another embodiment of the level detecting unit in FIG. 6.

Instead of the B-Level 1 measured in the test area, the B-Level 0 measured during real data recording (BL0det) can also be used as the reference value to adjust recording beam power in the steps S210 through S214. That is, it is to maintain the difference between B-Level 0 and B-Level 1 measured while recording real data constant, as shown in FIG. 10. To this end, the microcomputer 700 stores the difference between B-Level 0 and B-Level 1 (DBref=B-Level 0–B-Level 1) or the ratio of B-Level 0 to B-Level 1 (Bref=B-Level 0/B-Level 1) as the reference level in the course of the optimal power calibration (OPC). And then the microcomputer 70 measures the difference DBref or the ratio Bref while recording data and adjusts the recording beam power to make the difference or the ratio of measured values equal to the stored reference value. In this case, the estimated increment BL0est is used to compensate the value of the B-Level 0 (BL0det) to maintain the B-Level 0 constant as conducted before. Thus, the steps S21 through S23 compensates for the variation of the B-Level 0 due to th variation of the recording layer characteristic.

In the aforementioned embodiment, the level detecting unit 410 contains the amplifier 413 to amplify the level of the beam reflected from 11-T spaces, as shown in FIG. 7. However, the amplifier 413 can be omitted from the level detecting unit 410.

Figure 12:
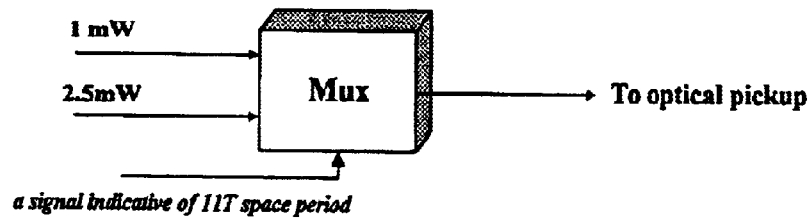
FIG. 12 is a schematic diagram showing the structure of an output selection logic employed by the optical drive in FIG. 6 when the level detecting unit in FIG. 11 is used.

In this case, to increase the level of the beam reflected in response to the reproducing beam, the reproducing beam power needs to be increased at 11-T spaces. To this end, the optical driver 31 has two power sources of 1 mW and 2.5 mW and the 2.5 mW power is applied to 11-T space signals through a Mux, as shown in FIG. 12.

Figure 13:
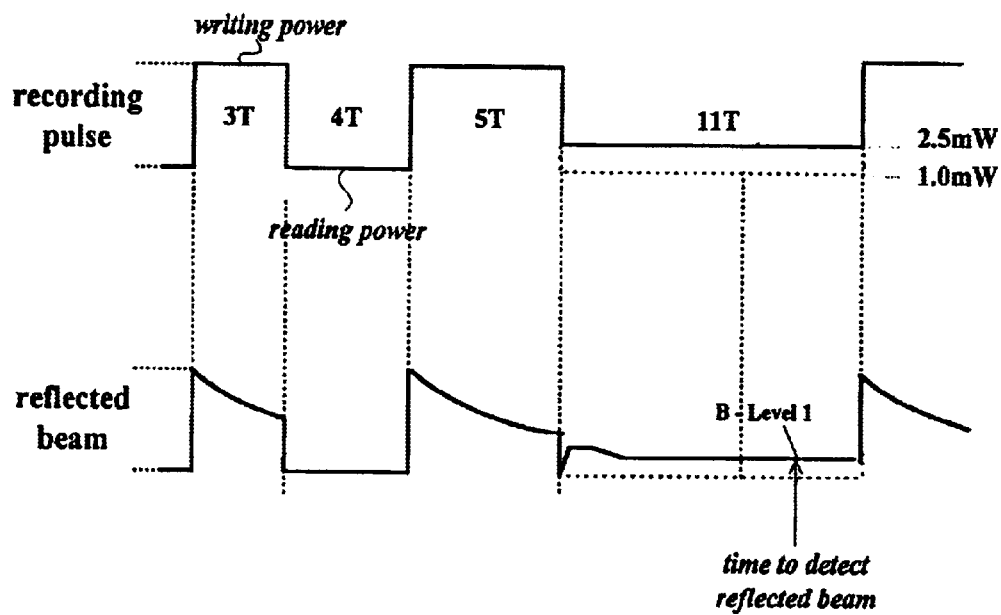
FIG. 13 is a graph showing the relation between the selected recording pulse and the reflected beam due to the recording pulse.

FIG. 13 shows an example waveform of recording pulse when the reproducing beam power is increased only at 11-T spaces. Because 11-T space signals are recorded with the power making it easier to detect the variation of beam level reflected from 11T-spaces, an additional amplifier is unnecessary to detect the variation of the B-Level 1.

The method and apparatus for controlling optimal writing power for an optical recording medium in accordance with the present invention adjust recording beam power in consideration of the thickness variation of the recording layer and therefore improve the quality of reproduced signals by maintaining a constant asymmetric ratio.

In addition, the method and apparatus for controlling optimal writing power for an optical recording medium in accordance with the present invention adjust the writing power in the defect area of the recording medium using the beam level reflected from spaces to which the reproducing beam is applied. Thus, if the beam level reflected from spaces is low due to defect, the recording beam power is increased to reduce the beam level reflected from marks, thereby maintaining a constant asymmetric ratio.

The invention may be embodied in other specific forms without departing from the sprit or essential characteristics thereof. The present embodiments are therefore to be considered in all respects as illustrative and not restrictive, the scope of the invention being indicated by the appended claims rather than by the foregoing description and all changes which come within the meaning and range of equivalency of the claims are therefore intended to be embraced therein.

What is claimed is:

1. A method for writing data on an optical recording medium, comprising the steps of:

(a) detecting a signal associated wit the thickness variation of a recording layer of the recording medium, wherein said signal is the difference between a reference level and the level of reflected beam in response to a reproducing beam to form spaces between recorded marks, and wherein the reference level is the level of the reflected beam in response to the reproducing beam whose power is obtained in an optimal power calibration process in a test area of the recording medium; and (b) controlling a recording beam power to compensate for the characteristic variation of recorded marks due to the thickness variation of the recording layer, based upon the detected signal.

2. A method for writing data on an optical recording medium, comprising the steps of:

(a) detecting a signal associated with the thickness variation of a recording layer of the recording medium, wherein said signal is the variation of the level of a reflected beam in response to a reproducing beam to form spaces between recorded marks, said spaces being of a specific length, and wherein the spaces of a specific length are recorded by the reproducing beam whose power is higher than a reference power for reproducing beam and lower than a reference power for recording beam; and (b) controlling a recording beam power to compensate for the characteristic variation of the recorded marks due to the thickness variation of the recording layer, based upon the detected signal.

3. The method set forth in claim 2, wherein the variation of the level of the reflected beam is amplified by a prescribed gain.

4. A method for writing data on an optical recording medium, comprising the steps of:

(a) detecting a signal associated with the thickness variation of a recording layer of the recording medium; and (b) Controlling a recording beam power to compensate for the characteristic variation of recorded marks due to the thickness variation of the recording layer, based upon the detected signal, wherein in said step (b), the recording beam power is adjusted to maintain the difference between the beam level reflected by a recording beam and the beam level reflected by a reproducing beam constant.

5. The method set forth in claim 4, wherein in said step (b), the variation of the level of the reflected beam in response to the recording beam whose power is adjusted in order to maintain the difference constant does not affect a writing power control process for maintaining the reflected beam level in response to the recording beam constant, by adjusting the measured value of the reflected beam in response to the recording beam by an amount estimated in consideration of the writing power adjustment.

6. The method set forth in claim 4, wherein in said step (a), said signal is the difference between a reference level and the level of the reflected beam in response to the reproducing beam to form spaces between said marks.

7. The method set forth in claim 6, wherein the reference level is the level of the reflected beam in response to the reproducing beam whose power is obtained in an optical power calibration process in a test area of the recording medium.

8. An apparatus for writing data on an optical recording medium, comprising:

a recording unit recording input data on said optical recording medium by converting the input data to an optical beam;

a detection unit detecting a signal associated with the thickness variation of a recording layer of said optical recording medium with respect to disk radius, wherein said signal is the difference between a reference level and the level of a reflected beam in response to a reproducing beam to form spaces between recorded marks, and wherein the reference level is the level of the reflected beam in response to the reproducing beam whose power is obtained in an optimal power calibration process in a test area of the recording medium: and a control unit controlling the power of the recording beam of said recording unit to compensate for the characteristic variation of the recorded marks due to the thickness variation of the recording layer of said optical recording medium, based upon the detected signal.

9. The apparatus set forth in claim 8, wherein the characteristic of the recorded marks is the level of the beam reflected from the recorded marks in response to the reproducing beam.

10. The apparatus set forth in claim 8, wherein the characteristic of the recorded marks is an asymmetric ratio of a mark signal to a space signal.

11. An apparatus for writing data on said optical recording medium, comprising:

a recording unit recording input data on said optical recording medium by converting the input data to an optical beam;

a detection unit detecting a signal associated with the thickness variation of a recording layer of said optical recording medium with respect to disk radius, wherein said signal is the variation of the level of a reflected beam in response to a reproducing beam to form spaces between recorded marks, said spaces being of a specific length, and wherein the spaces of a specific length are recorded by the reproducing beam whose power is higher than a reference power for reproducing beam and lower than a reference power for recording beam; and a control unit controlling the power of the recording beam of said recording unit to compensate for the characteristic variation of the recorded marks due to the thickness variation of the recording layer of said optical recording medium, based upon the detected signal.

* * * * *